United States Patent [19]

Bälz

[11] Patent Number: 4,479,606

[45] Date of Patent: Oct. 30, 1984

[54] REMOTE STEAM SYSTEM HAVING COMMON RECIRCULATION OF CONDENSATE AND METHOD FOR CONDENSATE RECIRCULATION

[76] Inventor: Helmut Bälz, Koepffstrasse 5, D-7100 Heilbronn, Fed. Rep. of Germany

[21] Appl. No.: 385,394

[22] PCT Filed: Sep. 21, 1981

[86] PCT No.: PCT/DE81/00150
§ 371 Date: May 19, 1982
§ 102(e) Date: May 19, 1982

[87] PCT Pub. No.: WO82/01237
PCT Pub. Date: Apr. 15, 1982

[30] Foreign Application Priority Data

Oct. 2, 1980 [DE] Fed. Rep. of Germany ....... 3037293

[51] Int. Cl.$^3$ .............................................. F24D 1/02
[52] U.S. Cl. ..................................... 237/67; 137/892; 122/407
[58] Field of Search ............................. 237/64, 67, 68; 137/892, 893, 895; 165/110, 111; 122/407

[56] References Cited

U.S. PATENT DOCUMENTS

| | | | |
|---|---|---|---|
| 1,046,303 | 12/1912 | Josse et al. | 237/68 X |
| 1,758,295 | 5/1930 | Rosenblad | 237/67 |
| 1,916,073 | 6/1933 | Rosenblad | 237/67 |
| 1,987,883 | 1/1935 | White et al. | 137/892 X |
| 2,484,086 | 10/1949 | Harrison | 237/67 |
| 2,614,543 | 10/1952 | Hood | 122/407 |
| 3,304,006 | 2/1967 | Adams | 237/67 |
| 3,478,726 | 11/1969 | Kikinis | 122/407 X |
| 3,567,589 | 3/1971 | Javet | 165/111 X |
| 3,934,799 | 1/1976 | Hull | 237/67 |

FOREIGN PATENT DOCUMENTS

| | | | |
|---|---|---|---|
| 622120 | 5/1927 | France | 237/64 |
| 277468 | 9/1927 | United Kingdom | 237/64 |

Primary Examiner—William E. Tapolcai
Attorney, Agent, or Firm—Frishauf, Holtz, Goodman & Woodward

[57] ABSTRACT

In a method for condensate recirculation of at least two condensate flows at different pressures and different temperatures in a closed circuit of a remote steam system having a high-pressure remote steam conduit, the two condensate flows are to be fed into a common condensate recirculation conduit without externally supplied auxiliary energy and without energy losses. To this end, the procedure is that the pressure and the temperature in the condensate recirculation conduit are between the pressures and the temperatures of the condensate flows and that the condensate flow having the lower pressure is pumped in the condensate flow having the higher pressure into the condensate recirculation conduit, and the condensate flows are mixed together before their entry into the condensate recirculation conduit.

15 Claims, 2 Drawing Figures

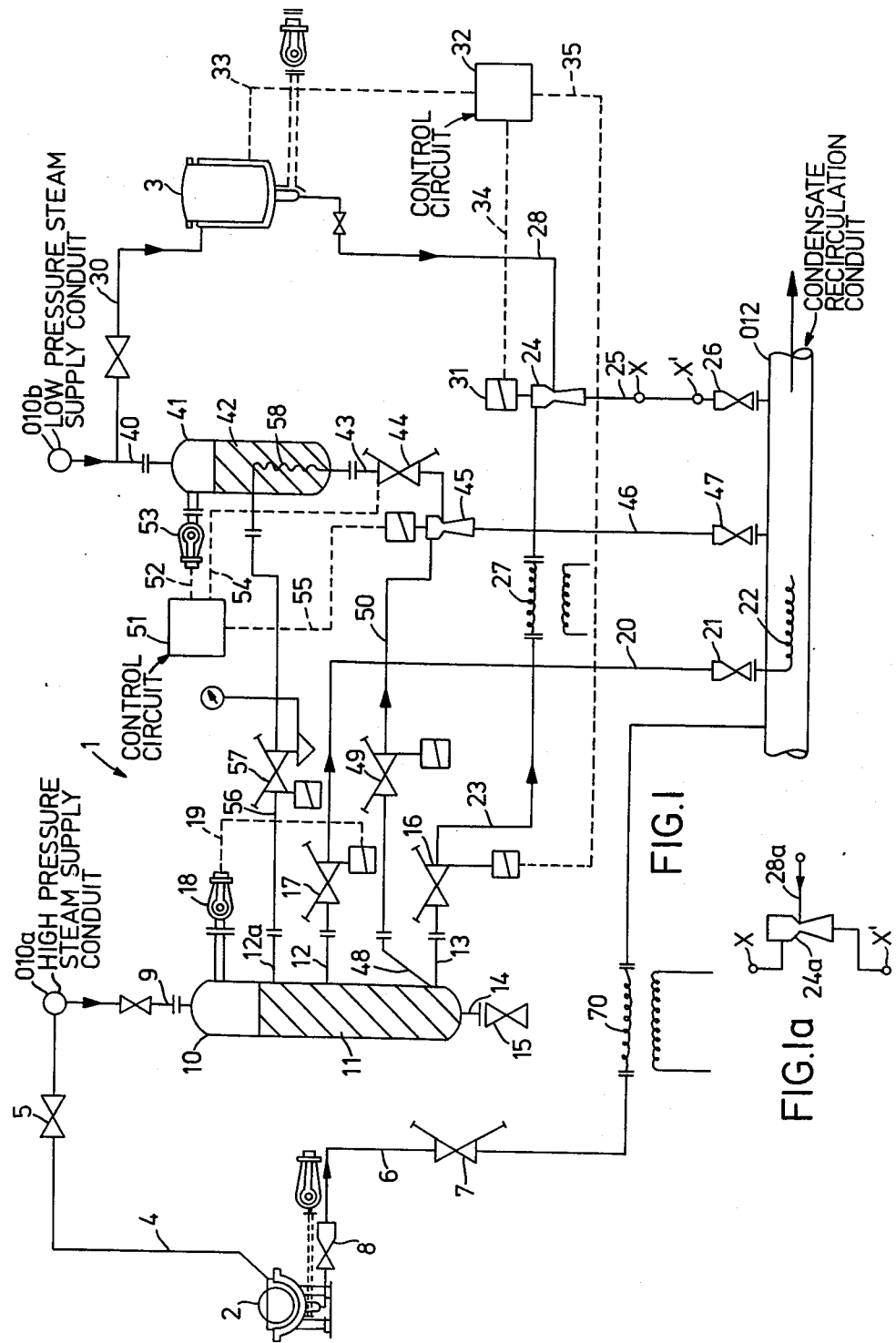

4,479,606

REMOTE STEAM SYSTEM HAVING COMMON RECIRCULATION OF CONDENSATE AND METHOD FOR CONDENSATE RECIRCULATION

The invention relates to a method for condensate recirculation of at least two condensate flows, which are at different pressures and temperatures, in a closed circuit of a remote steam system. The invention is also based on a remote steam system having common recirculation of at least two condensate flows, at different pressures and temperatures, in a common condensate recirculation conduit.

BACKGROUND

In remote systems having heat consumers which operate at different temperatures and pressures, problems in recirculating the condensate frequently arise. The goal is to use one common collection conduit or main conduit for recirculating the condensate from all the consumers. However, when a common condensate conduit is used, the different pressures and the resultant different boiling temperatures cause condensate backups, evaporation and banging. These undesirable effects impair the functioning of the remote steam system.

It is therefore known in practice to provide devices for equalizing the temperatures of the different condensate flows, using condensate coolers or injection coolers, which may under some circumstances also be suitable for simultaneously recovering heat.

For pressure equalization between the various condensate flows, it is known to provide relief means or special fixtures for reducing pressure. However, these devices have the disadvantage that pressure equalization is attained at the cost of a substantial loss in energy.

THE INVENTION

It is an object to provide a method in which condensate flows at different pressures and temperatures can be fed into a common condensate recirculation conduit without externally supplied auxiliary energy and without any loss of energy. It is a further object of the invention to create a steam supply system in which condensate flows at different pressures and temperatures can be fed into a common condensate recirculation conduit without externally supplied auxiliary energy and without any loss of energy.

Briefly, condensate at the higher pressure is used to pump condensate at a lower pressure into a common condensation recirculation conduit, while at the same time the higher pressure and lower pressure condensates are mixed together. In accordance with a preferred feature of the invention, the pumping and mixing operation is carried out, simultaneously, in a single step and by a single element, namely by a jet, or injection pump. The method becomes very simple and the steam supply system becomes generally maintenance-free where the jet pump is used for pumping and mixing the various condensate flows.

In accordance with a feature of the invention, and in pressure and in sufficient quantity to effect pumping, the drainage condensate from the remote high-pressure steam conduit which has been collected in a container can be used as the pumping condensate, while in the steam supply system a container or vessel for collecting the drainage condensate is connected to the remote high-pressure steam conduit, and the drive mechanism of the pumping device is connected to this container or vessel.

Depending upon the outlet temperature of the mixing device, it may be efficacious to adapt the temperature of the intermixed condensate flows further to the temperature in the condensate recirculation conduit; to this end, the steam supply system is provided with a heat exchanger, which is disposed ahead of the pumping device in the flow direction.

If there is a further condensate flow which is at a pressure and temperature lower than those of the condensate flow exiting from the mixing device, then the further condensate flow can be pumped with a similar pumping and mixing device into the condensate recirculation conduit.

DRAWINGS

FIG. 1 shows a detail of a steam supply system according to the invention in schematic form; and FIG. 1a is a fragmentary drawing of another embodiment.

DETAILED DESCRIPTION

The closed steam supply system 1 of the illustration, in which two schematically illustrated heat consumers 2 and 3 are provided with steam heat, includes a high-pressure steam supply conduit 010a, a low-pressure steam supply conduit 010b and a condensate recirculation conduit 012, which returns the resultant condensate flows of the two heat consumers 2 and 3, which operate at different steam pressures, to a heating station, not shown. The heat consumer 2, by way of example, is a mangle, and the heat consumer 3 is a boiler, which are located in a kitchen.

The heat consumer 2 is connected via a steam conduit 4 and a shutoff valve 5 to the high-pressure steam supply conduit 010a, while the condensate resulting in the heat consumer 2 is fed via a condensate conduit 6 and a condensate diverter valve 7 disposed in the condensate conduit 6 and a check valve into the condensate recirculation conduit 012, in which an average pressure is maintained by means of pressure maintenance valves, not shown further. For better heat utilization or for temperature equalization, a heat exchanger 70 may be disposed in the condensate conduit 6.

For draining the high-pressure steam supply conduit 010a, a conduit 9 is also provided, leading to a pressure reservoir or vessel 10 in which condensate at high pressure is collected from the high-pressure steam supply conduit 010a. The pressure container 10 has a total of four further connection fittings 12, 12a, 13 and 14, of which connection fitting 14 communicates with a drainage valve 15, connection fitting 13 communicates with a magnetically controlled condensate diverter valve 16 and connection fitting 12 also communicates with a condensate diverter valve 17. The connection fitting 12 discharges into the pressure container 10 at a level which is within an arbitrary range below the maximum condensate fill level, while the connection fitting 13 discharges into the pressure container 10 at the lowest possible point. At the upper end of the pressure container 10, there is a level-indication transducer 18; if a predetermined condensate fill level in the pressure container 10 is exceeded, this transducer 18 opens the condensate diverter valve 17 via an electrical control line 19. A condensate conduit 20 is connected to this condensate diverter valve 17 and discharges via an appropriate check valve 21 into the condensate recirculation conduit 012, which serves as a common header. Since the condensate 11 which may be fed via the condensate conduit 20 into the condensate recirculation conduit 012 is at a relatively high temperature, then if a heat exchanger (not shown) is not provided in the condensate conduit 20, an injection cooler 22 has to be disposed in the condensate recirculation conduit 012 in order to prevent condensate banging.

On the output side, the condensate diverter valve 16 communicates via a condensate conduit 23 with the propulsion nozzle of an adjustable jet pump 24, which is connected on the outlet side with a conduit 25. The conduit 24 carries the condensate exiting from the propulsion nozzle 24 into the condensate recirculation conduit 012 via a check valve 26. Depending upon the temperature of the condensate fed via the conduit 23, a heat exchanger or cooler 27 may be provided in the conduit 23 so that a temperature equalization is effected, thus adapting the condensate flowing from the jet pump 24 to the temperature in the condensate recirculation conduit 012.

The intake side of the jet pump 24 leads via a condensate conduit 28 to the condensate connection of the heat consumer 3, which is connected via a steam conduit 30 to the low-pressure steam supply conduit 010b.

In order to control the drive mechanism of the jet pump 24, a control circuit 32 is provided, which ascertains the operating parameters of the condensate in the heat consumer 3 via appropriate measurement probes (not shown) and measurement lines 33 and controls either the propulsion nozzle of the jet pump 24 or the condensate diverter valve 16 in accordance with these parameters. To this end, the two last-named elements are connected via electrical connecting lines 34 and 35 with the control circuit 32. The question of which operating parameters of the condensate in the heat condenser 3, such as pressure, temperature and condensate flow per unit of time, will be efficaciously ascertained is determined by the particular heat consumer 3 being used and by its thermal or dynamic behavior.

In order to collect the drainage condensate from the low-pressure steam supply conduit 010b, a condensate vessel 41 is connected to this conduit 010b via a conduit 40. In order to remove the collected drainage condensate 42, a conduit 43 is connected to the condensate container 41 and discharges via a condensate diverter valve 44 into the intake side of a further adjustable jet pump 45. On the outlet side, the adjustable jet pump 45 is connected via a conduit 46 and a check valve 47 to the common condensate recirculation conduit 012.

As in the case of the adjustable jet pump 24, the propulsive medium for the adjustable jet pump 45 is again the condensate 11 collected in the pressure reservoir 10. To this end, the pressure reservoir 10 communicates via a further connection fitting 48, a condensate diverter valve 49 and a condensate conduit 50 with the propulsion nozzle of the adjustable jet pump 45. In order to regulate the jet pump 45 and the condensate diverter valve 44, a control circuit 51 is provided, which is connected via a control line 52 with the level-indication transducer 53 disposed on the condensate container 41, while the further control lines 54 and 55 lead respectively to the condensate diverter valve 44 or to the adjusting device of the jet pump 45.

Instead of feeding the excess drainage condensate from the high-pressure steam supply line 010a directly via the conduit 20 and the injection cooler 22 into the common condensate recirculation conduit 012, it is also possible for a connection fitting 12a to be disposed on the pressure container 10, from whence a condensate conduit 56 leads via appropriate pressure fixtures 57 to an injection cooler 58 disposed in the condensate container 41.

OPERATION

High-pressure steam is fed from the high-pressure remote steam conduit 010a via the steam conduit 4 into the heat consumer 2, in which the steam condenses; the resultant condensate flow still has a relatively high pressure and a relatively high temperature. The condensate flow leaving the heat consumer 2 is fed via the condensate conduit 6 directly into the common condensate recirculation conduit 012 of the remote steam system, which functions as a closed circuit; this direct feeding is possible because the pressure and the temperature in the common condensate recirculation line 012 are selected such that when the condensate flow is introduced via the condensate conduit 6 from consumer 2, neither condensate backup nor evaporation nor banging occurs.

The drainage condensate from the high-pressure steam supply line 010a arising during the operation of the remote steam system 1 is at high pressure and is conveyed via the condensate conduit 9 to the pressure container 10 and collected. If the quantity of drainage condensate 11 collected in the pressure container 10 exceeds a predetermined maximum level, the level-indication transducer 18 responds and opens the condensate diverter valve 17, so that the excess drainage condensate, which is at high pressure, is delivered after a reduction in pressure, for instance in the condensate diverter valve 17, to the injection cooler 22; from there, this drainage condensate is added to the condensate in the condensate recirculation conduit 012 and thus mixed thereto.

Alternatively or in addition, it is also possible to divert the excess condensate collected in the pressure container or vessel 10 via connection 12a, the pressure-reduction apparatus 57, and the conduit 56 into the injection cooler 58 of the condensate container 41 connected to the low-pressure steam conduit 010b.

Depending on the resultant quantity of drainage condensate, a heat exchanger may under some circumstances be provided in the condensate conduit 20, in order to conduct away excess heat from the condensate arriving from the pressure container 10 or to utilize this heat. In every instance, the condensate derived from the pressure vessel 10 is reliably adapted, prior to its introduction into the condensate recirculation conduit 012, to the temperature and pressure prevailing there.

Condensate is also created in the heat consumer 3, which is connected to the low-pressure steam supply conduit 010b; this condensate is carried away via the condensate conduit 28. The condensate flow arising in the heat consumer 3 is, however, at a pressure and a temperature which under some circumstances may be substantially below the pressure and temperature in the condensate recirculation conduit 012, so that diverting it directly into the condensate recirculation conduit 012 is not possible. The condensate flow there is accordingly delivered to the intake side of the jet pump 24, which pumps this low-pressure condensate flow via the conduit 25 into the common condensate recirculation conduit 012. Serving as the propulsive medium for the jet pump 24 and thus for the low-pressure condensate flow from the condensate conduit 28 is the drainage condensate from the high-pressure steam supply conduit 010a which has been collected in the pressure container 10 and is at high pressure and at a relatively high temperature; this drainage condensate is delivered via the diverter valve 16 to the propulsion nozzle of the jet pump 24.

The control circuit 32 here controls the drive mechanism of the jet pump 24 or, as needed, the diverter valve 16 in accordance with the operating parameters of the condensate flow in the condensate conduit 28 in such a manner that a condensate flow in the condensate line 25 is created at the outlet of the jet pump 24, the pressure and temperature of which flow are adapted to the pressure and temperature in the condensate recirculation conduit 012. The jet pump 24 here functions as a pumping device in order to pump the condensate flow from the condensate conduit 28 up to the higher pressure in the condensate recirculation conduit 012; the jet pump 24 furthermore acts as a mixing device, in order to mix together the condensate flow from the condensate conduit 28, which is at a relatively low temperature, with the condensate flow from the condensate conduit 23, which is at a relatively high temperature; the result is thus a temperature which is between the temperatures of the two condensate flows and is approximately in the range of the temperature in the condensate recirculation conduit 012.

If in all operating situations a temperature can be maintained on the part of the mixed condensate flows from the condensate conduits 28 and 23 such that evaporation and condensate banging do not occur in the common condensate recirculation conduit 012, then the mixed condensate flow leaving the jet pump 24 can be introduced directly into the condensate recirculation conduit 012. On the other hand, if there is a possibility that the temperature may deviate excessively from the temperature in the condensate recirculation conduit 012, then it may be efficacious to effect a temperature reduction via the cooler 27 in the condensate conduit 23, so that the condensate mixture leaving the jet pump 24 is further adapted to the temperature in the condensate recirculation conduit 012.

By using the jet pump 24 and the pressure container 10 together with the control circuit 32, the advantage is attained that, without using additional auxiliary energy, the condensate flow arriving from the heat consumer 3, which in comparison with the condensate flow arriving from the heat consumer 2 is at a relatively low pressure and relatively low temperature, can be fed into a common condensate recirculation conduit 012.

In order to drain the low-pressure steam supply conduit 010b, the condensate collection container 41 is connected via the conduit 40; the condensate 42 collected in this container 41 is at a relatively lower pressure, so that without further treatment it can be fed into the condensate recirculation conduit 012. In order to increase the pressure, there is the further, adjustable jet pump 45, which is likewise operated with propulsive energy from the pressure container 10, or in other words with the drainage condensate 11 located in this pressure container 10. In case the condensate 42 in the condensate collection container 41 should exceed a predetermined level, the level-indication transducer 53 will respond, so that the control circuit 51 accordingly opens the condensate diverter valve 44 and adjusts the adjustable jet pump 45, so that the condensate 42 which is at a relatively lower pressure can be fed into the common condensate recirculation conduit 012.

Depending upon the design of the remote steam system 1, the possibility also exists of operating a 24a, see FIG. 1a, switched in cascade fashion with the jet pump 24, with the condensate flow leaving the jet pump 24 by breaking line 25 at x-x' and inserting jet pump 24a as shown; in this manner, the pressure existing at the outlet of the first jet pump can be reduced further and utilized for pumping a further condensate flow 28a from an additional heat not shown, whose exiting condensate flow is at a still lower pressure and a still lower temperature.

The possibility also exists of providing heat exchangers in each of the condensate conduits, in order to further use the heat of the condensate.

I claim:
1. In a steam supply system,
a method for condensate recirculation of at least two condensate flows including outlet flow from at least one steam consumer (2, 3), wherein the condensate flows are at different pressures and different temperatures within a closed circuit of the steam supply system, said system having a high-pressure steam supply conduit (010a), and a condensate recirculation conduit (012) wherein the pressure and temperature in the condensate recirculation conduit (012) are above the pressures and the temperatures of the condensate flows from at least one other steam consumer,
comprising the steps of pumping the condensate flow having the pressure lower than that in the condensate recirculation conduit (012) into the condensate recirculation conduit (012) by applying pumping energy derived from the condensate flow of higher pressure to a pumping means consisting of a jet pump, said jet pump being the sole pumping means for the condensate flow having the lower pressure;
and mixing the higher and lower pressure condensate flows with one another before their entry into the condensate recirculation conduit (012).

2. A method as defined by claim 1, characterized in that the pumping and mixing steps are carried out conjointly in the jet pump (24)
and the jet pump is coupled to the condensate flow at the higher pressure and derives its pump energy therefrom.

3. A method as defined by claim 1 characterized by the step of deriving pumping energy by collecting drainage condensate from the high-pressure steam supply conduit (010a), in a vessel (10);
and applying the collected higher pressure drainage condensate as a pumping fluid for pumping the condensate flow having the lower pressure.

4. A method as defined by claim 1 characterized by the step of adapting the pressure and/or the temperature of the intermixed condensate flows to the temperature in the condensate recirculation conduit (012).

5. A method as defined by claim 1 characterized by the step of pumping a further condensate flow which is at a lower pressure than the mixed condensate flow and by applying pumping energy derived from the mixed condensate flow.

6. Method according to claim 1 including the step of collecting drainage condensate from the high-pressure steam supply conduit (010a) in a vessel (10);
and the steps of pumping the condensate flow having the lower pressure and mixing the higher and lower condensate flows comprises applying the collected condensate from said vessel to a jet, or injection pump for conjointly carrying out the pumping and mixing steps and operating the injection, or jet pump (24) by the pressure derived from the condensate having the higher pressure.

7. A steam supply system for common condensate recirculation of at least two condensate flows from at least one source (3, 28; 41, 43, 44) of low pressure condensate, which flows are at different pressures and different temperatures, said system having (3, 42) a common condensate recirculation conduit (012) in which a pressure above that of at least one of the condensate flows pertains, and having a high-pressure steam supply conduit (012a);

and comprising a pumping device (24) consisting of a jet pump coupled to and solely driven by the condensate flow having the higher pressure and connected for pumping of the condensate flow having the lower pressure into the condensate recirculation conduit (012), said jet pump being the sole pumping device for condensate flow having the lower pressure;

and a mixing device (24) coupled to the higher pressure and the lower pressure condensate flows in which the pumped condensate flows are mixed, located in the paths of the condensated flows and ahead of the entrance of said condensate flows into the condensate recirculation conduit (012).

8. A steam supply system as defined by claim 7, characterized in that the pumping device and the mixing device is a single element, said element comprising the jet pump (24).

9. A steam supply system as defined by claim 8, characterized in that the jet pump (24) is adjustable.

10. A steam supply system as defined by claim 7, further comprising a pressure vessel (10) connected to the high-pressure steam supply conduit (010a), the pressure vessel collecting drainage condensate (11); and fluid conduit means (13, 16, 23) connecting the pressure vessel (10) and the pumping device (24) and supplying operating energy thereto.

11. A steam supply system as defined by claim 10 further comprising a heat exchanger (27) disposed in the fluid conduit means ahead of the pumping device (24).

12. A steam supply as defined by claim 1 further comprising a second pumping device (24a) driven by the condensate flow exiting from the mixing device (24), means (28a) for supplying to said second pumping device a further condensate flow for pumping into the condensate recirculation conduit (012);

and a second mixing device (24a), which mixes together the two condensate flows arriving from the second pumping device (24a).

13. A steam supply system as defined by claim 12, wherein said second pumping device and said second mixing device is a single element, said element comprising the jet pump (24a).

14. A steam supply system as defined by claim 13, characterized in that the pumping device and the mixing device is a single element comprising the jet pump (24).

15. A steam supply system as defined by claim 7 further comprising a pressure vessel (10) connected to the high-pressure steam supply conduit (010a), the pressure vessel collecting drainage condensate;

wherein the pumping device and the mixing device is a single element comprising the jet pump (24);

and fluid conduit means (13, 16, 23) are provided connecting the pressure vessel and said jet pump and supplying operating energy to the jet pump for pumping the condensate flow having the lower pressure into the condensate recirculating circuit (012) and at the same time mixing the condensate flows.

* * * * *